AUTOMATIC SORTING SYSTEM

Original Filed June 24, 1959 4 Sheets-Sheet 1

INVENTOR.
STANFORD B. SILVERSCHOTZ
BY Sidney Segal
ATTORNEY

AUTOMATIC SORTING SYSTEM
Original Filed June 24, 1959 4 Sheets-Sheet 2
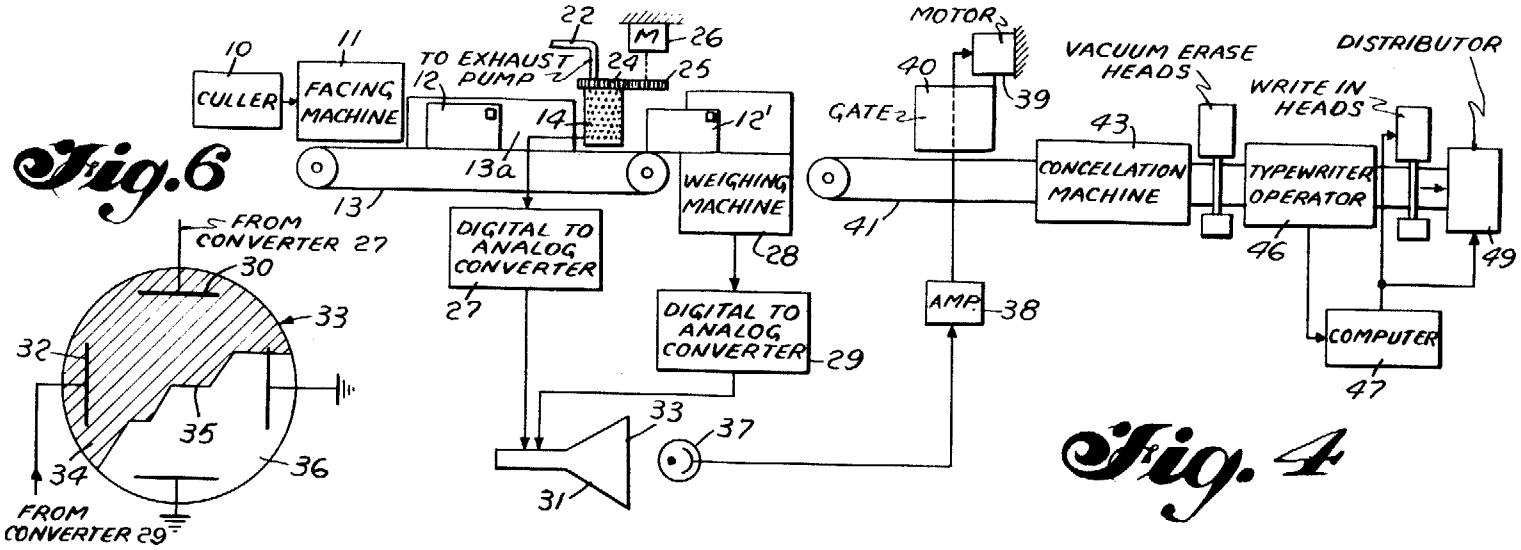
Fig. 4
Fig. 6
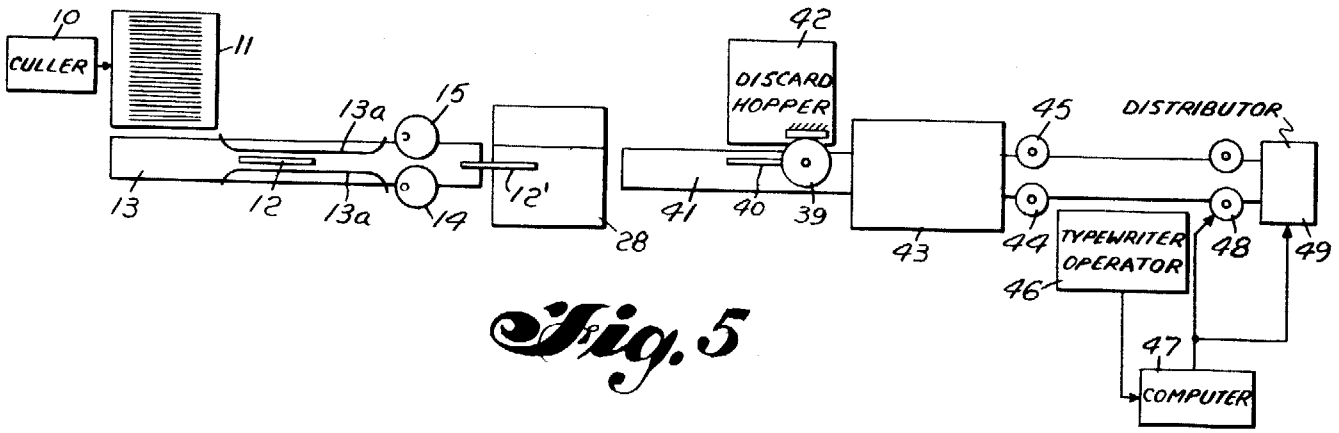
Fig. 5
INVENTOR.
STANFORD B. SILVERSCHOTZ
BY Sidney Togut
ATTORNEY

AUTOMATIC SORTING SYSTEM

Original Filed June 24, 1959 4 Sheets-Sheet 3

INVENTOR.
STANFORD B. SILVERSCHOTZ
BY Isidore Togut
ATTORNEY

AUTOMATIC SORTING SYSTEM

Original Filed June 24, 1959 4 Sheets-Sheet 4

INVENTOR.
STANFORD B. SILVERSCHOTZ
BY Sidney Togut
ATTORNEY

United States Patent Office

Re. 25,998
Reissued Mar. 29, 1966

25,998
AUTOMATIC SORTING SYSTEM

Stanford B. Silverschotz, Livingston, N.J., assignor to International Telephone and Telegraph Corporation, Nutley, N.J., a corporation of Maryland Original No. 3,136,424, dated June 9, 1964, Ser. No. 822,623, June 24, 1959. Application for reissue Oct. 4, 1965, Ser. No. 493,310
16 Claims. (Cl. 209—111.8)

Matter enclosed in heavy brackets [ ] appears in the original patent but forms no part of this reissue specification; matter printed in italics indicates the additions made by reissue.

This invention relates to a system for automatic sorting of *objects such as* mail *and containers* and more particularly to a system wherein the stamp affixed to the mail *or labels affixed to the containers* contains material in which can be encoded the denomination information of the stamp *or label* and the destination information of the mail *or containers.*

Automation of postal functions is rapidly becoming a necessity because of the requirements for increased efficiency in the handling of greater and greater quantities of mail. Burdensome manual operations, such as culling, facing and sorting, are under study by postal authorities with automation of these functions as a goal. Gross handling methods are also being improved by installation of modern industrial materials handling devices. Postal development work has been done on photoelectric address readers, electromechanical sorting machines, address coding, mechanical facing machines, etc. Fluorescent and magnetic inks for postage discrimination and other applications are also being evaluated. It is desirable to provide automation for those functions, which utilizes a single factor for facing, postage discrimination, cancelling, sorting, and recording of code routing information. It is also desirable that such a method be compatible with electromechanical distributing machines already in use in post offices.

*Efficient automatic sorting of packages and containers in commercial and industrial establishments is also urgently required because of the enormous increase in wholesale sales and retail sales to consumers.*

It is therefore an object of this invention to provide a single means factor which can be utilized automatically in most of the functions of mail *and container* sorting and distribution.

It is a further object to provide a medium for encoding information relating to a stamp *or label* denomination and the destination of the mail *or container* on which the stamp *or label* is affixed.

Another object is to provide for an automatic mail sorting system which utilizes this single medium for the automatic sorting and distribution of mail.

A feature of this invention is a postage stamp *or label* for use on mail or containers which contains magnetically permeable material and having the denomination of the stamp *or label* encoded in the magnetic material.

Another feature is that the destination information for the mail *or containers* can be encoded in the magnetic material of the stamp *or label.*

A further feature is that the denomination information for the stamp *or label* is provided in discrete circles of magnetization, each circle denoting a denomination unit and the total encoded circles of the stamp denotes the denomination of the stamp *or label.*

Another feature is a system for automatic sorting of mail having a postage stamp thereon which contains magnetically permeable material and the denomination of the stamp encoded in the magnetic material. Means are provided for sensing the denomination encoding to determine the denomination of the stamp and for determining the actual stamp value required for the mail bearing the stamp. The actual stamp denomination and the required stamp value are then compared to determine whether the mail has the correct stamp value thereon. Pursuant to the information resulting from this comparison, the mail is then routed onward for cancellation and further sorting if the stamp denomination is equal to or more than the actual stamp value required. If the stamp denomination is less than the actual stamp value, then the mail is discarded automatically for manual handling.

Another feature of this automatic system is that subsequent to the steps of cancellation, the destination information is encoded in the magnetic material of the stamp and pursuant to this destination information, the mail is automatically sorted and distributed in conformance with known techniques.

The above-mentioned and other features and objects of this invention will become more apparent by reference to the following description taken in conjunction with the accompanying drawings, in which:

FIG. 4 is a side elevation view of the system for automatic sorting of mail;

FIG. 5 is a plan view of the system;

FIG. 6 is a view of the screen of the cathode ray tube used in this invention;

When the bags of mail arrive at a post office, parcels and letters may be intermixed in each bag. The first process therefore is to cull parcels out of the letter mail. There is also culled out overstuffed envelopes which are called "slugs," the large manila-type envelopes called "flats" and other first class mail not cancellable by machine. Air mail and other letters requiring separate handling are also removed at this point. It is not contemplated that this invention contributes to the automation of the culling process. Systems are now being devised for automatic culling of mail which when perfected can be used with the system of this invention.

After the letters have been culled from the incoming mail, the addressed faces must be oriented for cancellation of stamps and for reading. Machines have been developed and are being marketed which perform this function automatically. After facing, the mail must be examined to determine whether the actual stamp value required by the weight of the letter has been affixed to the mail. If the affixed stamp is found to be of the correct denomination, then the cancelled mail is sorted and prepared for distribution.

Figure 1:
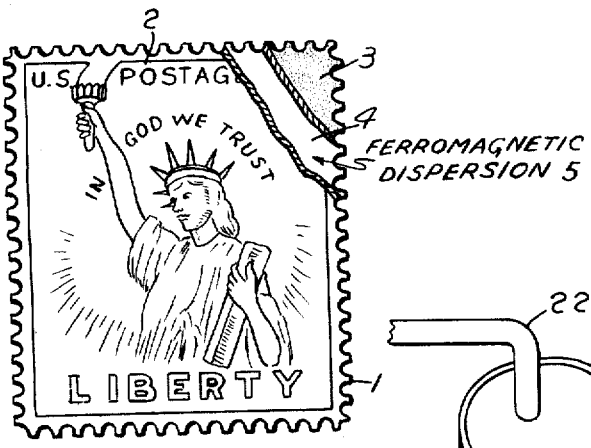
FIG. 1 is an illustration of the postage stamp of this invention.
Figure 2:
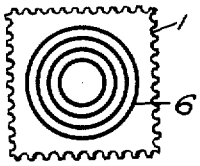
FIG. 2 is another illustration of the postage stamp of this invention showing the magnetized circles for denoting denomination.
Figure 3:
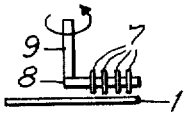
FIG. 3 illustrates a device for magnetizing the circles.
Figure 7:
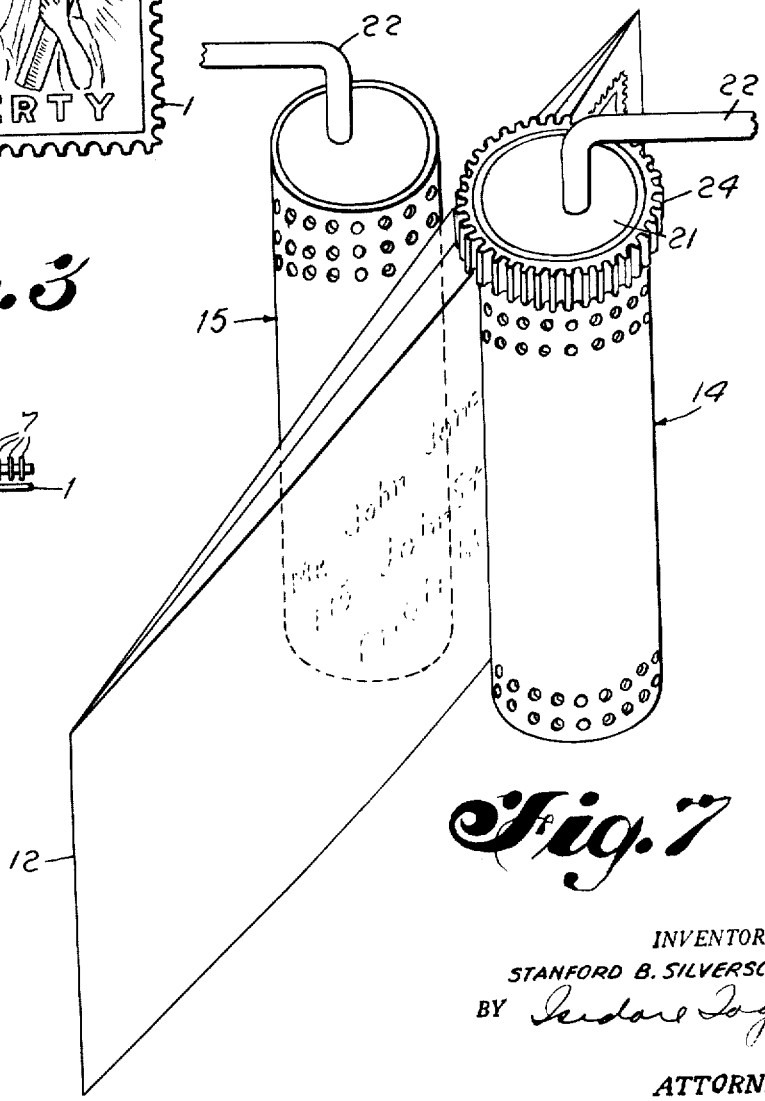
FIG. 7 is a view illustrating the passage of the letter between the vacuum sensing rollers used in the system of this invention.
Figure 8:
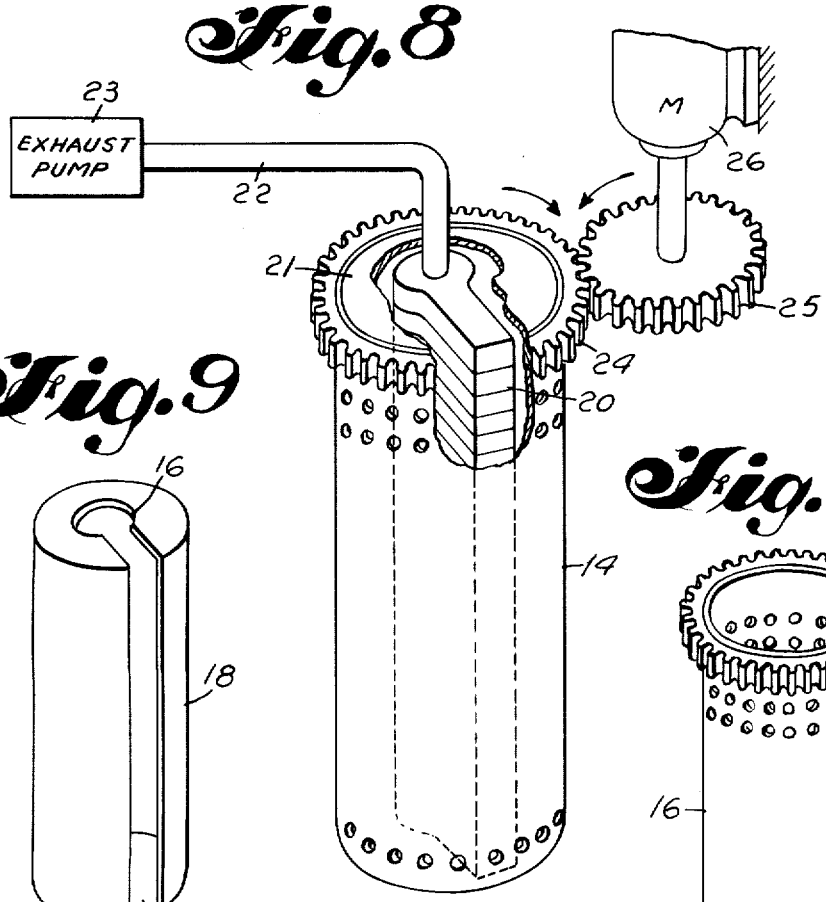
FIG. 8 is an assembly view partially broken illustrating the construction of the vacuum roller.
Figure 9:
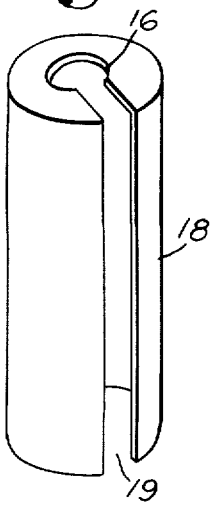
FIG. 9 is a view of the outer cylinder of the vacuum roller.
Figure 10:
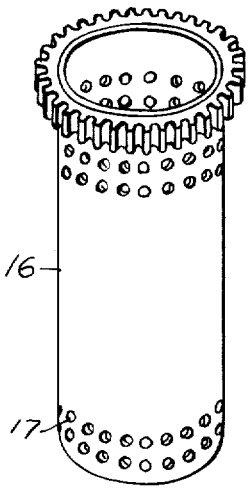
FIG. 10 is a view of the inner cylindrical sealer of the vacuum roller.

With reference to FIG. 1, there is shown the ferromagnetic postage stamp 1 that is to be used in the automatic mail sorting system of this invention. The stamp 1 comprises the usual material in front surface 2 and the gum 3 on the back surface of the stamp and additionally includes ferromagnetic material 4 disposed under the gum of the stamp across the surface thereof. This ferromagnetic material may consist of finely divided particles dispersed in a vehicle that is insoluble in water or saliva. Such a coating can be applied during the manufacture of the stamps in a manner not unlike the method now used for applying the gum adhesive. The ferromagnetic coating would of course precede the application of the gum. In effect then, the stamp becomes a segment of magnetic tape. The use of the ferromagnetic stamp transcends the recording of information. Facing and postage determination operations can also take advantage of the magnetic stamp. The denomination of the stamp will be encoded in the magnetic material 4 at the time of manufacture of the stamp. The denomination can be printed as magnetized circles 6, shown in FIG. 2. Each circle 6 will correspond to a basic denomination unit and the total number of circles will correspond to the total denomination of the stamp. One way of printing magnetized circles on the stamp is to have a device, such as shown in FIG. 3, wherein a multiplicity of spaced apart bar magnets 7 are disposed above the stamp 1 on a bar 8 of non-magnetic or dielectric material. The bar 8 is fastened to a shaft 9 which is turned by motor means (not shown). The bar magnets 7 are rotated about the shaft 9 and thereby encode magnetic circles 6 in the ferromagnetic material 4 of the stamp. The ends of the bar magnets 7 adjacent to the surface of the stamp 1 have the same pole, either all north or all south, so that there will be substantially a minimum interaction between the magnetic fields of the circles. The spacing between the bars can also be adjusted to minimize the interaction between the magnetic field of the circles.

*While FIG. 1 illustrates a postage stamp embodying this invention, the invention is also adaptable for labels or tags which may be used for merchandise of all kinds and which may be glued onto the merchandise or containers or otherwise affixed thereon. The front surface 2 may have any desired picture or indicia printed thereon. The information to be encoded in the magnetic material of the label may be identification indicia, such as style numbers, part numbers, etc., and price for example. Of course, it is understood that other information as required will be encoded. In the sorting or shipping process for the merchandise, destination information as described above can be easily encoded.*

*The sorting system using the ferromagnetic postage stamp of this invention will now be described. It is to be understood, however, that the sorting system is equally adaptable to the sorting of containers using the ferromagnetic label, with, of course, appropriate modifications of the equipment to handle packages instead of mail.*

Referring now to FIGS. 4 and 5, there is shown an automatic mail sorting system using the ferromagnetic postage stamp. The process starts with the culling of the mail as explained above. Any culler 10 may be used which is appropriate. From the culler 10, the mail is fed into a facing machine 11 of the types similar to the ones manufactured by Mix & Genest, of Germany, or Pitney-Bowes, Inc. It is possible to use the photoelectric cell devices of these machines for performing the facing operations or if desired these photoelectric devices may be replaced by magnetic sensing devices to cooperate with the magnetic postage stamp to accomplish the appropriate facing. From the facing machine, the mail illustrated by a letter 12 is fed out in an upright position onto a conveyor belt 13. The conveyor belt 13 carries the letter 12 onward between guide fences 13a and feeds it between two vacuum rollers 14 and 15. These vacuum rollers are more particularly shown in FIGS. 7, 8, 9, 10 and 12. It is not necessary to have sensing or magnetic heads in each roller since only the roller which is adjacent to the stamp requires the magnetic head. The vacuum roller 14 which contains the magnetic readout heads consists of an outer cylinder 16 fabricated from a thin highly polished non-magnetic metal or other non-magnetic material having numerous aligned holes 17 on the peripheral surface. The outer cylinder 16 slidably fits over an inner sealer 18 in such a manner that the outer cylinder 16 is free to rotate about the inner sealer 18 which is in a fixed position. The inner sealer 18 is formed in the shape of a cylinder concentric with the outer cylinder 16 but has a comparatively narrow slot 19 extending over the entire length thereof. The segmented magnetic heads 20 are disposed inside of the inner sealer also in a fixed position and in such a manner that the aligned gaps of the magnetic heads are spaced in the center of the slot. The magnetic heads 20 may be of the type described in the publication "Ampex FR–100" published by the Ampex Corporation, Redwood City, California, 1956, which describes on page 13 a stacked assembly of interleaved magnetic heads. Another example of multiple magnetic head stacking suitable for use in this invention is disclosed in U.S. Patent No. 2,880,280. The bottom and top surfaces are sealed with covers 21, which may be, for example, force fitted into the top and bottom openings of the outer cylinder 16, so that the whole assembly is air tight except for that portion contiguous to the slot 19. A tube 22 inserted in the top cover 21 leads to an exhaust pump 23 which when in operation provides for a constant partial vacuum within the roller 14. An O-ring seal 60 well known to the art may be provided about the tube 22 to maintain an airtight condition and the whole assembly of the center cylinder 16 and the top and bottom covers 21 is freely rotatable about the inner sealer 18 and the magnetic heads inside. A spur gear ring 24 is affixed to the top end portion of the perforated cylinder 16 and a matching gear 25 which is coupled to a motor 26 meshes with the gear 24. The segmented magnetic heads 20 and the inner seal 18 can be supported from the tube 22 in a fixed position relative to the outer cylinder 16 so that when the motor 26 is in operation it will rotate the outer cylinder 16 about the inner sealer 18 and the segmented heads 20 and as each vertical alignment of holes 17 of the outer cylinder 16 rotate about the slot 19, air will be exhausted through these holes by the exhaust pump 23. As the letter 12 starts to pass between the vacuum rollers 14 and 15, the air being pulled through the holes in the outer cylinders of both vacuum rollers tends to grip the sides of the letter spreading it apart and also pushing it onwards progressively between the rollers 14 and 15. As the letter then moves onward, the magnetic heads 20 will pick up the encoded information in the magnetic circles in the ferromagnetic material of the stamp affixed to the letter. By using the vacuum rollers and adjusting the space therebetween in the correct manner, it is possible to pull the sides of the letters towards the rollers so that any magnetic material or steel clips or the like that may be within the letter will be farther away from the magnetic heads 20 and thereby unable to affect the information pick-up operation thereof. In any magnetic recording and playback machine, the gap between the playback head and the magnetic medium which is being read out must be kept to a minimum. By pulling the letter apart at opposite sides, the stamp will ride closely adjacent the head but the iron material, if any, in the letter will be too far from the playback head to substantially affect any information transfer from the stamp to the readout head. As the letter 12 passes between the rollers 14 and 15 and is moved onward by the rotation of the perforated cylinder 16, the stamp 1 moves past the magnetic heads 20. Any segmented head 20 which passes over a portion of a magnetic circle and is tangent to that circle will thereby pick up the magnetic information in the form of a pulse. The segmented heads 20 which are not tangent to the circle will not pick up any information. Therefore, for each circle on the stamp two pulses will be generated in the magnetic pick-up heads 20. The position of the stamp on the letter does not affect the pick up of the signal since the relative position of the circles with respect to the pick-up heads 20 is unaffected thereby. The pulses generated in the pick-up heads 20 are then fed to a digital-to-analog converter 27 where the pulse information is converted to an analog voltage. A digital-to-analog converter that may be used in this system is described on pages 485, 486, and 494–499 of the publication "Digital Computer Components and Circuits," by R. K. Richards, published by D. Van Nostrand Company, Inc. of New York City, New York, 1957. The letter 12 after passing between the vacuum rollers 14 and 15 is then fed onto a weighing machine 28 where it is weighed and a pulse output is derived therefrom indicative of the weight of the letter. Such a weighing machine can be similar to the Toledo Printweight "400" manufactured by the Toledo Scale Division of Toledo Scale Corporation, Toledo, Ohio, U.S.A. This machine translates the weight data into digital form for recording as a weight or for transmission to other devices. The digital pulse output of the weighing machine 28 is fed into a digital-to-analog converter 29 to convert the pulse output of the weighing machine 28 to analog form. The analog output of converter 27 is coupled to a vertical deflection plate 30 of a cathode ray tube 31 and the analog output of the converter 29 is coupled to a horizontal deflection plate 32 of the cathode ray tube. The other horizontal and vertical plates are coupled to ground. Referring to FIG. 6, there is shown a view of the screen 33 of the cathode ray tube 31. The horizontal and vertical deflection plates are shown therein for the purpose of explaining this invention only and it is to be understood that they do not thus appear. A mask 34 shown as a shaded area covers the screen 33 of the cathode ray tube. The irregular line 35 represents a graph wherein the ordinate represents the denomination required on a letter and the abscissa represents the weight of the letter. The corresponding relationship of weight to denomination is, of course, determined by the Post Office so that at any point on that line 35 the weight of the letter must correspond to the stamp denomination required for that weight. It is to be understood that the line 35 is not representative of any actual conditions but merely an illustration for explaining the operation of this invention. The shaded area 34 above the line 35 represents the acceptable stamp denomination versus weight of any letter. The unshaded area 36 below the line 35 represents the unacceptable ratio of stamp denomination versus weight of letter and is therefore indicative of the rejection area. When the voltage outputs of converters 27 and 29 are fed to the deflection plates 30 and 32, they determine a luminous spot and if this occurs in the acceptable area 34, this luminous spot will not be visible because of the presence of the mask 34. However, if a spot appears in the unmasked area 36, it will, of course, be visible on the face of the cathode ray tube. A photoelectric cell 37 is disposed adjacent the screen 33 of the cathode ray tube. The photoelectric cell 37 will respond to any luminous spot appearing in the unmasked area of the screen 33. The output of the photoelectric cell 37 is thereupon fed to an amplifier 38. The output of the amplifier 38 energizes a reversible motor 39 or solenoid, to rotate a gate 40 which is disposed above the conveyor belt 41 to deflect the letter, whose recorded weight value is greater than the denomination of the stamp on the letter, into a discard hopper 42. If the recorded weight value is equivalent to or less than the denomination value of the stamp, there will be no output of the photoelectric cell 37, as explained above, to operate the motor 39 and the letter will continue onward on the conveyor belt 41 and enter the cancellation machine 43. This cancellation machine can be the one manufactured by Pitney-Bowes, Inc., or similar machines which are now being marketed. It is not necessary to explain the operation of these machines since they are well known to those acquained with the postal art. From the cancellation machine the letter will then pass vacuum rollers

Figure 11:
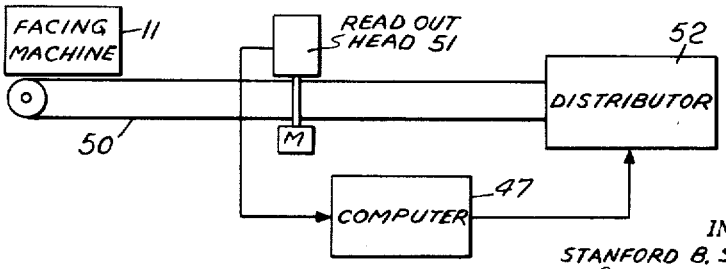
FIG. 11 is an elevation view of this system for automatic sorting of mail with encoded destination information.
Figure 12:
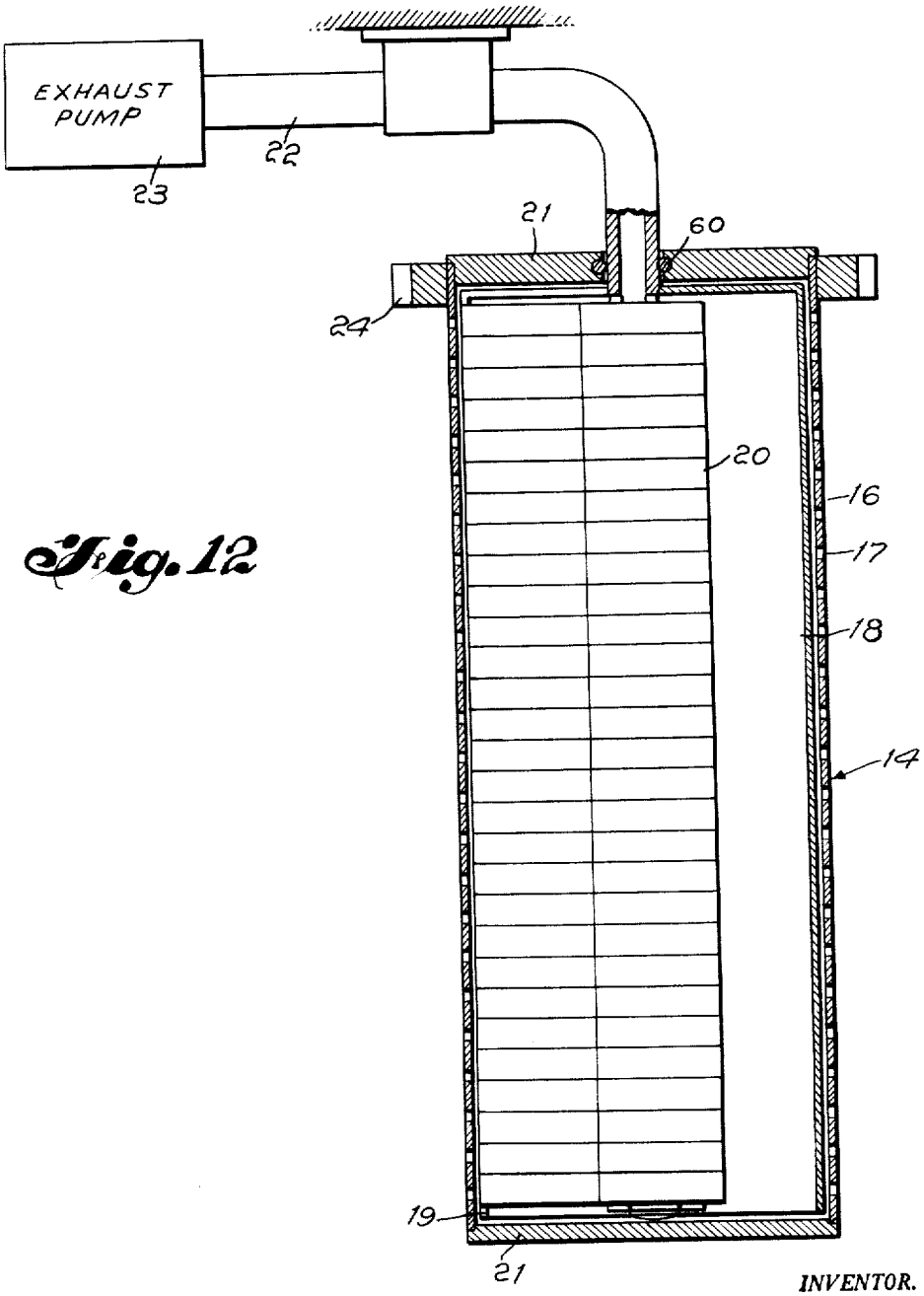
FIG. 12 is a section view of the vacuum sensing roller of FIG. 8, rotated approximately 90 degrees to show clearly the relationship of the various elements therein.

44 and 45 similar in construction and operation to the vacuum rollers 14 and 15 described above, where the denomination information will be erased by erase heads incorporated in the roller 44. The erase heads may be of similar type as the heads described in "Ampex FR–100" or Patent No. 2,880,280, and in accordance with standard magnetic reproducing technique an erasing current of the correct frequency is fed thereto. The erase operation is optional since it is possible to write in on the magnetizable material of the stamp the destination information even though the denomination information is still present therein since the destination information will be written in at a different frequency and a different form. From the vacuum rollers 44 and 45, the letter passes onward on the conveyor belt 41 past a typewriter station 46 where a typewriter operator will scan the address on the letter. To machine handle the mail, the destination of the letter written on the envelope must be translated into machine language: This is done by coding. Once coded, letters can be sorted or resorted by several automatic machines located at various post offices. The coding operation is performed by the typwriter operator at station 46 whereby a set of simple mental rules, the code is derived for the destination name(s); the operator types the code on the typewriter and this information is fed into a computer 47. The code information fed into the computer is then translated into digital information which in turn is fed into write-in head 48, such as described in the publication Ampex FR–100 referred to above and to a distributor 49. The code destination can be similar to the system used by the Canadian Post Office as described in the 1958 IRE National Conventional Record, volume 6, part 6, pages 245 to 258, inclusive. The computer 47 can also be similar to the computer described in this article or the Electronic Digital Computer Model 704, manufactured by the International Business Machines Corporation. Another suitable computer is a digital computer Model 220, manufactured by the Burroughs Corporation. The sorting of the mail for different destinations is done in the distributor 49 in accordance with the information transmitted by the computer 47 and can be similar to the sorting system described in the article. The digital information fed into the write-in head 48 is then converted into pulses magnetically encoded in the ferromagnetic material 4 of the stamp 1. With reference to FIG. 11, there is shown an elevation view of this system for sorting mail received from another post office which has encoded destination information on the stamps after the letter has passed through the system described in FIGS. 4 and 5. The operations here are similar to the operations described above and it is to be understood that the necessary units described above will be utilized here to the same extent where necessary. Received letters are fed from the facing machine 11 onto a conveyor belt 50 where they move past vacuum roller 51 containing segmented read-out heads similar to the read-out heads in roller 14, and the digital information so read out is fed into a computer 47. The computer output is then fed into a distributor 52 for sorting the mail into the appropriate areas for distribution to other post offices or for manual delivery by mailmen.

While I have described above the principles of my invention in connection with specific apparatus, it is to be clearly understood that this description is made only by way of example and not as a limitation to the scope of my invention as set forth in the objects thereof and in the accompanying claims.

I claim:

1. A postage stamp for use on mail containing magnetically permeable material wherein the denomination of said stamp and the destination information for said mail is encoded in said magnetic material, said denomination information comprising discrete magnetized circles of encoded information in said magnetic material, each discrete magnetized circle denoting a denomination unit and the total encoded circle denoting the total denomination of said stamp.

2. A postage stamp according to claim 1 wherein said circles are disposed concentrically in said magnetic material.

3. A system for sorting of mail having thereon a postage stamp containing magnetically permeable material and the denomination of said stamp encoded in said magnetic material comprising means for sensing the denomination encoding to determine the demonination of said stamp, means to determine the correct stamp value required for the mail carrying the stamp and means to compare the correct stamp value with the actual stamp denomination determined by said sensing means and means for conveying said mail in a predetermined direction to said sensing means.

4. A system for sorting of mail according to claim 3 further including means for encoding in said magnetic material the destination information of said mail carrying said stamp, said conveying means carrying said mail to said encoding means.

5. A system for sorting of mail having thereon a postage stamp containing a recording medium and the denomination of said stamp encoded in said medium comprising means for sensing the denomination recorded in said medium, means to determine the correct stamp value required for the mail carrying the stamp, means to compare the correct stamp value with the actual denomination, means to route said mail responsive to said comparison, means for encoding in said medium the destination information of said mail on said stamp and means for conveying said mail in a predetermined direction to said sensing means and said encoding means.

6. A system for sorting of mail according to claim 5 further including means responsive to said encoded destination information and disposed adjacent said conveying means to sort said mail.

7. A system for sorting of mail according to claim 5 wherein said medium is magnetic material and said sensing means comprises a pair of oppositely disposed cylinders, said conveying means carrying said mail between said cylinders and magnetic means incorporated in at least one of said cylinders for sensing the denomination encoding.

8. A system for automatic sorting of mail having thereon a postage stamp containing magnetically permeable material and the denomination of said stamp encoded in said magnetic material comprising means to convey said mail in an upright position, first and second rollers disposed opposite each other in parallel side-by-side relation adjacent said conveying means and adapted for passage of said mail therebetween, means included in said rollers to exert an attractive force on the sides of said mail thereby urging said sides into contact with said first and second rollers, means to rotate said rollers and urge said mail onward, a plurality of magnetic sensing means disposed within at least one of said rollers for sensing the denomination of said stamp and producing a digital output proportional to said denomination, means to weigh said mail adjacent said conveying means and derive a predetermined digital output proportional to the weight of said mail, means to convert said digital outputs of said sensing means and said weighing means to analog voltages, means to correlate said analog voltages to determine whether said sensed denomination is acceptable for said predetermined weight value and means responsive to said correlation and disposed adjacent said conveying means to reject said mail when said sensed denomination is unacceptable for said predetermined weight value.

9. A device for gripping and moving a mail envelope and sensing intelligence carried by the envelope comprising first and second rollers disposed in parallel side-by-side relation, each of said rollers comprising an outer perforated cylinder, an inner cylinder concentric with said outer cylinder and having a slot extending axially along the periphery thereof, first and second covers enclosing the ends of said outer cylinder, said outer cylinder being adapted to rotate about said inner cylinder, on exhaust pump, means coupling said exhaust pump to one end of each of said roller to evacuate air from said rollers, means for rotating said outer cylinder whereby when said envelope is moved towards the adjacency of said first and second rollers the evacuation of air from said rollers will cause each said roller to grip the sides of said envelope adjacent that roller and urge that side towards said roller spreading apart the sides of said envelope and the rotation of said outer cylinder of said first roller will urge said envelope onward between the outer cylinder of said first and second rollers, and means disposed inside the inner cylinder of one of said rollers adjacent said slot to sense the intelligence carried by said envelope.

10. A postage stamp for use on mail containing magnetically permeable material adapted to carry intelligence disposed over the surface of said stamp on the side opposite the face thereof and underlying the adhesive material of said stamp.

11. A postage stamp according to claim 10 wherein the denomination of said stamp is encoded in said magnetic material.

12. A postage stamp according to claim 10 wherein the destination information for said mail is encoded in said magnetic material.

*13. A label for use on a container containing magnetically permeable material wherein the denomination of said label and the destination information for said container is encoded in said magnetic material, said denomination information comprising discrete magnetized circles of encoded information in said magnetic material, each discrete magnetized circle denoting a denomination unit and the total encoded circle denoting the total denomination of said label.*

*14. A label for use on containers containing magnetically permeable material adapted to carry intelligence disposed over the surface of said label on the side opposite the face thereof and underlying the adhesive material of said label.*

*15. A label according to claim 14 wherein the denomination of said label is encoded in said magnetic material.*

*16. A label according to claim 14 wherein the destination information of said label is encoded in said magnetic material.*

References Cited by the Examiner

The following references, cited by the Examiner, are of record in the patented file of this patent or the original patent.

UNITED STATES PATENTS

| | | | |
|---|---|---|---|
| 1,217,092 | 2/1917 | Hopp. | |
| 2,244,723 | 6/1941 | Novick | 93—61 |
| 2,547,838 | 4/1951 | Russell | 209—111.8 X |
| 2,609,928 | 9/1952 | Doust | 209—111.5 |
| 2,612,994 | 10/1952 | Woodland et al. | 209—111.5 |
| 2,625,265 | 1/1953 | Cox | 209—111.5 |
| 2,697,514 | 12/1954 | Stahl | 209—72 |
| 2,709,001 | 5/1955 | Stahl | 209—72 |
| 2,719,629 | 10/1955 | Robinson | 209—72 |
| 2,759,603 | 8/1956 | Bradley | 209—121 |
| 2,950,005 | 8/1960 | MacDonald | 209—111.5 X |
| 3,040,323 | 6/1962 | Brenner | 209—111.8 X |

FOREIGN PATENTS

| | | |
|---|---|---|
| 540,600 | 10/1941 | Great Britain. |

ROBERT B. REEVES, *Primary Examiner.*